(12) United States Patent
Hensel et al.

(10) Patent No.: US 10,487,232 B2
(45) Date of Patent: Nov. 26, 2019

(54) STAIN RESISTANT, SOFT TOUCH COATING COMPOSITIONS AND COATINGS FORMED THEREFROM

(71) Applicant: PPG Industries Ohio, Inc., Cleveland, OH (US)

(72) Inventors: Gereme Thomas Hensel, Pittsburgh, PA (US); Renlong Gao, Westlake, OH (US); Irina G. Schwendeman, Wexford, PA (US); Gobinda Saha, Pittsburgh, PA (US); Jiping Shao, Sewickley, PA (US); Courtney Richman, Long Beach, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 39 days.

(21) Appl. No.: 15/580,811

(22) PCT Filed: Jun. 9, 2016

(86) PCT No.: PCT/US2016/036699
§ 371 (c)(1),
(2) Date: Dec. 8, 2017

(87) PCT Pub. No.: WO2016/201103
PCT Pub. Date: Dec. 15, 2016

(65) Prior Publication Data
US 2018/0163072 A1    Jun. 14, 2018

Related U.S. Application Data

(60) Provisional application No. 62/172,826, filed on Jun. 9, 2015.

(51) Int. Cl.
| | | |
|---|---|---|
| C09D 127/12 | (2006.01) |
| C08G 18/50 | (2006.01) |
| C08G 18/58 | (2006.01) |
| C08G 18/62 | (2006.01) |
| C09D 167/00 | (2006.01) |
| C09D 175/04 | (2006.01) |
| C08G 18/40 | (2006.01) |
| C08G 18/42 | (2006.01) |
| C08G 18/46 | (2006.01) |
| C08G 63/12 | (2006.01) |
| C08G 18/73 | (2006.01) |
| C08G 63/16 | (2006.01) |
| C08G 63/181 | (2006.01) |

(52) U.S. Cl.
CPC ....... *C09D 127/12* (2013.01); *C08G 18/4009* (2013.01); *C08G 18/4018* (2013.01); *C08G 18/4063* (2013.01); *C08G 18/423* (2013.01); *C08G 18/4236* (2013.01); *C08G 18/4241* (2013.01); *C08G 18/4607* (2013.01); *C08G 18/5015* (2013.01); *C08G 18/582* (2013.01); *C08G 18/6279* (2013.01); *C08G 18/73* (2013.01); *C08G 63/12* (2013.01); *C08G 63/16* (2013.01); *C08G 63/181* (2013.01); *C09D 167/00* (2013.01); *C09D 175/04* (2013.01)

(58) Field of Classification Search
USPC ......................................................... 524/507
See application file for complete search history.

(56) References Cited

U.S. PATENT DOCUMENTS

| | | |
|---|---|---|
| 4,910,292 A | 3/1990 | Blount |
| 5,178,915 A | 1/1993 | Moyle et al. |
| 5,256,761 A | 10/1993 | Blount, Jr. |
| 5,338,613 A | 8/1994 | Tomotsugu et al. |
| 5,362,820 A | 11/1994 | Moens et al. |
| 5,378,757 A | 1/1995 | Blount, Jr. et al. |
| 7,807,752 B2 | 10/2010 | Masutani et al. |
| 8,163,850 B2 | 4/2012 | Marsh et al. |
| 8,168,721 B2 | 5/2012 | Marsh et al. |
| 8,293,840 B2 | 10/2012 | Masutani et al. |
| 8,354,460 B2 | 1/2013 | Nagel et al. |
| 8,389,113 B2 | 3/2013 | Ambrose et al. |
| 8,524,834 B2 | 9/2013 | Marsh et al. |
| 9,029,461 B2 | 5/2015 | Marsh et al. |
| 2002/0164460 A1 | 11/2002 | Bacon, Jr. |
| 2004/0109947 A1 | 6/2004 | Weinert, Jr. et al. |
| 2004/0241471 A1 | 12/2004 | Lee et al. |
| 2005/0288431 A1 | 12/2005 | Gindin et al. |
| 2010/0204388 A1 | 8/2010 | Marsh et al. |
| 2010/0204392 A1 | 8/2010 | Marsh et al. |
| 2010/0204401 A1 | 8/2010 | Marsh et al. |
| 2012/0172520 A1 | 7/2012 | Marsh et al. |
| 2013/0034741 A1 | 2/2013 | Mauer, III et al. |

(Continued)

FOREIGN PATENT DOCUMENTS

| | | |
|---|---|---|
| CN | 1494487 A | 5/2004 |
| CN | 1721485 A | 1/2006 |

(Continued)

OTHER PUBLICATIONS

Nagel et al., "New silicone structures", European Coatings Journal, 2010, pp. 32-39, vol. 4.

*Primary Examiner* — Terressa Boykin
(74) *Attorney, Agent, or Firm* — Justin P. Martinchek

(57) ABSTRACT

A stain resistant, soft touch coating composition can include: (a) a fluoropolymer comprising at least one reactive functional group; (b) a polyester polyol; and (c) a crosslinker reactive with (a) and (b). The polyester polyol can include a reaction product obtained from a mixture of reactants including: an aliphatic diol; a polyol having 3 or more hydroxyl groups; and a cyclic polycarboxylic acid, or an anhydride or ester thereof.

20 Claims, No Drawings

(56) References Cited

U.S. PATENT DOCUMENTS

| | | |
|---|---|---|
| 2013/0296470 A1 | 11/2013 | Marsh et al. |
| 2013/0296488 A1 | 11/2013 | Marsh et al. |
| 2014/0275396 A1 | 9/2014 | Chasser et al. |
| 2014/0296406 A1 | 10/2014 | Marsh et al. |
| 2014/0296407 A1 | 10/2014 | Marsh et al. |
| 2014/0364542 A1 | 12/2014 | Flosbach et al. |

FOREIGN PATENT DOCUMENTS

| | | |
|---|---|---|
| CN | 1263782 C | 7/2006 |
| EP | 0713503 B1 | 5/1996 |
| EP | 1905790 A1 | 4/2008 |
| EP | 2626394 A1 | 8/2013 |

STAIN RESISTANT, SOFT TOUCH COATING COMPOSITIONS AND COATINGS FORMED THEREFROM

CROSS REFERENCE TO RELATED APPLICATIONS

This application claims the benefit of U.S. Provisional Application No. 62/172,826, filed Jun. 9, 2015, which is incorporated herein by reference in its entirety.

FIELD OF THE INVENTION

The present invention relates to coating compositions that can provide good stain resistance and soft touch properties, coatings formed from these coating compositions, and substrates at least partially coated with such coatings.

BACKGROUND OF THE INVENTION

Coatings applied to consumer electronic devices such as cellular phones, portable notebooks, laptops, and the like are often designed to have a soft touch or feel. However, these soft touch coatings often exhibit poor stain resistance. As a result, most soft touch coatings are typically restricted to application on black or other dark substrates. Various attempts have been made to improve the stain resistance of soft touch coatings to expand their application to white and other light colored substrates. However, improvement of stain resistance is often accompanied by a deterioration of the soft touch properties. As such, it is desirable to provide coatings that exhibit a combination of good stain resistance and soft touch properties.

SUMMARY OF THE INVENTION

The present invention is directed to a coating composition that includes: (a) a fluoropolymer comprising at least one reactive functional group; (b) a polyester polyol; and (c) a crosslinker reactive with (a) and (b). The polyester polyol includes a reaction product obtained from a mixture of reactants including: an aliphatic diol; a polyol having 3 or more hydroxyl groups; and a cyclic polycarboxylic acid, or an anhydride or ester thereof.

The present invention also includes substrates, electronic products, and electronic components at least partially coated with the coating compositions described herein.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" fluoropolymer, "a" polyester polyol, "a" crosslinker, and the like refer to one or more of any of these items.

As indicated, the present invention is directed to a coating composition that includes a fluoropolymer having at least one reactive functional group. As used herein, a "fluoropolymer" refers to a polymer derived from one or more monomers with at least one of the monomers having at least one pendant fluorine substituent. For example, the fluoropolymer can include a polymer that has a monomeric repeat unit selected from chlorotrifluoroethylene, tetrafluoroethylene, perfluoro(methyl vinyl ether), perfluoro(propyl vinyl ether), perfluoro(ethyl vinyl ether), vinylidene fluoride, hexafluoropropylene, and combinations thereof. The fluoropolymer can also include a polymer that has a monomeric repeat unit selected from tetrafluoroethylene oxide, hexafluoropropylene oxide, and combinations thereof. As used herein, the term "polymer" refers to oligomers and homopolymers (e.g., prepared from a single monomer species), copolymers (e.g., prepared from at least two monomer species), and graft polymers. The term "resin" is used interchangeably with "polymer." The fluoropolymer and other resins such a polyester polyol described herein can be used to form a film. A "film-forming resin" refers to resins that can form a self-supporting continuous film on at least a horizontal surface of a substrate upon removal of any diluents or carriers present in the composition.

Non-limiting examples of suitable fluoropolymers that can be used with the coating compositions of the present invention include fluoroethylene/alkyl vinyl ether copolymer, perfluoropolyether, a chlorotrifluoroethylene copolymer, polyvinylidene fluoride, a tetrafluoroethylene copolymer, polyhexafluoropropylene, polytetrafluoroethylene, and combinations thereof and which comprise or are modified to comprise at least one reactive functional group. Suitable fluoropolymers are also commercially available from Asahi Glass Co. under the trade name LUMIFLON® and from Daikin Industries under the trade name ZEFFLE®.

Further, as previously mentioned, the fluoropolymer can include or be modified to include at least one reactive functional group. A "reactive functional group" refers to an atom, group of atoms, functionality, or group having sufficient reactivity to form at least one covalent bond with another reactive group in a chemical reaction. Non-limiting examples of reactive functional groups that can be used with the fluoropolymer include hydroxyl groups, thiol groups, (meth)acrylate groups, carboxylic acid groups, amine groups, epoxide groups, carbamate groups, amide groups, urea groups, isocyanate groups (including blocked isocyanate groups), and combinations thereof. When hydroxyl groups are used as the reactive functional groups, the fluoropolymer can comprise a hydroxyl value of less 300 mg KOH/g, less than 250 mg KOH/g, less than 200 mg KOH/g, less than 150 mg KOH/g, less than 100 mg KOH/g, or less than 50 mg KOH/g. The fluoropolymer can also comprise a hydroxyl value of at least 1 mg KOH/g, or at least 10 mg KOH/g, or at least 20 mg KOH/g.

The hydroxyl value of the polyester polyol is determined by esterification of the sample with excess acetic anhydride. The excess acetic anhydride is converted to acetic acid by hydrolysis and titrated potentiometrically with standard potassium hydroxide. The volume difference of titrate potassium hydroxide between a blank (no reaction) and the sample corresponds to the acid content of the sample, from which the hydroxyl number is calculated as the number of milligrams of potassium hydroxide needed to neutralize the acid in one gram of sample. The hydrolyzing solution used in the determination is a mixture of dimethylformamide, pyridine, and distilled water, and the acetylating reagent is a mixture of acetic anhydride and dichloroethane with p-toluene sulphonic acid as the catalyst.

The fluoropolymer used with the coating compositions of the present invention can comprise at least 1 weight %, at least 5 weight %, at least 10 weight %, at least 20 weight %, 30 weight %, at least 40 weight %, at least 50 weight %, or at least 60 weight %, based on the total resin solids of the coating composition, which is the total solids of the fluoropolymer and any additional film forming resin and which does not include the crosslinker. The fluoropolymer used with the coating compositions of the present invention can comprise up to 95 weight %, up to 90 weight %, up to 80 weight %, up to 70 weight %, or up to 60 weight %, based on the total resin solids of the coating composition. The fluoropolymer can also comprise a range such as from 1 to 95 weight %, from 5 to 95 weight %, from 10 to 90 weight %, or from 20 to 80 weight %, from 40 to 90 weight %, or from 60 to 80 weight %, based on the rein solids of the coating composition.

The coating composition of the present invention also includes a polyester polyol. The polyester polyol can comprise a reaction product obtained from a mixture of reactants including, but not limited to, an aliphatic diol, a polyol comprising 3 or more hydroxyl groups, and a cyclic polycarboxylic acid such as a cyclic diacid.

As used herein, a "polyol" refers to a compound comprising two or more hydroxyl groups, and a "diol" refers to a compound having only two hydroxyl groups. The term "aliphatic" refers to non-aromatic straight, branched, or cyclic hydrocarbon structures that contain saturated carbon bonds. The saturated carbon chain or chains of the aliphatic structures can also comprise and be interrupted by other elements including, but not limited to, oxygen, nitrogen, carbonyl groups, and combinations thereof. Thus, the saturated carbon chain of the aliphatic structures can comprise, but is not limited to, ether groups, ester groups, and combinations thereof.

Further, the term "linear" refers to a compound having a straight hydrocarbon chain, the term "branched" refers to a compound having a hydrocarbon chain with a hydrogen replaced by a substituent such as an alkyl group that branches or extends out from a straight chain, and the term "cyclic" refers to a closed ring structure.

The aliphatic diol used to prepare the polyester polyol can comprise one or more aliphatic diols, such as at least two, at least three, or at least four aliphatic diols. For example, the mixture of reactants used to prepare the polyester polyol can comprise two different aliphatic diols. The aliphatic diols can be linear, branched, and/or cyclic. For instance, the mixture of reactants used to prepare the polyester polyol can include one or more, such as at least two, branched aliphatic diols that comprise at least 50 mole %, at least 60 mole %, at least 70 mole %, at least 80 mole %, at least 90 mole %, or at least 95 mole % of the total amount of diols used to prepare the polyester polyol. The mixture of reactants used to prepare the polyester polyol can include one or more, such as at least two, branched aliphatic diols that comprise up to 98 mole % or up to 100 mole % of the total amount of diols used to prepare the polyester polyol. It is appreciated that the reactants can be free of certain aliphatic diols, such as cyclic aliphatic diols for example.

The aliphatic diols can include various types of diols including aliphatic ester glycols for example. Non-limiting examples of suitable aliphatic diols include ethylene glycol, diethylene glycol, triethylene glycol, 1,2-propylene glycol, 1,3-propane diol, 2-methyl-1,3-propanediol, 1,4-butane diol, 1,5-pentanediol, 2,2,4-trimethyl 1,3-pentanediol, 2,4-diethyl-1,5-pentanediol, 1,6-hexane diol, 2-ethyl-1,3-hexanediol, neopentyl glycol, propylene glycol, tetraethylene glycol, pentaethylene glycol, hexaethylene glycol, heptaethylene glycol, octaethylene glycol, nonaethylene glycol, decaethylene glycol, 3-hydroxy-2,2-dimethylpropyl 3-hydroxy-2,2-dimethylpropanoate (also known as hydroxypivalyl hydroxypivalate glycol or HPHP glycol), 1,2-cyclohexanedimethanol, 1,3-cyclohexanedimethanol, 1,4-cyclohexanedimethanol, hydrogenated bisphenol A, and combinations thereof.

The aliphatic diol can comprise at least 10 weight %, at least 15 weight %, at least 20 weight %, or at least 25 weight % of the total weight of the reactants used to prepare the polyester polyol. The aliphatic diol can comprise up to 60 weight %, up to 50 weight %, up to 40 weight %, or up to 35 weight % of the total weight of the reactants used to prepare the polyester polyol. The aliphatic diol can also comprise a range such as from 10 weight % to 60 weight %, from 15 weight % to 40 weight %, or from 25 weight % to 35 weight % of the total weight of the reactants used to prepare the polyester polyol.

The polyol comprising 3 or more hydroxyl groups can include various types of polyols such as aliphatic, aromatic, linear, branched, and/or cyclic polyols comprising 3 or more hydroxyl groups. Non-limiting examples of suitable polyols comprising 3 or more hydroxyl groups include trimethylolpropane, trimethylolethane, 1,2,5-hexanetriol, polyether triols, di-trimethylol propane, pentaerythritol, di-pentaerythritol, trimethylol butane, glycerol, tris(2-hydroxyethyl) isocyanurate, and combinations thereof.

The polyol comprising 3 or more hydroxyl groups can comprise at least 3 weight %, at least 5 weight %, at least 10 weight %, at least 20 weight %, at least 25 weight %, or at least 30 weight % of the total weight of the reactants used to prepare the polyester polyol. The polyol comprising 3 or more hydroxyl groups can comprise up to 45 weight %, or up to 40 weight % of the total weight of the reactants used to prepare the polyester polyol. The polyol comprising 3 or more hydroxyl groups can also comprise a range such as from 3 to 45 weight %, or from 10 to 40 weight %, or from 20 to 40 weight %, or from 25 to 40 weight %, or from 30 to 40 weight % of the total weight of the reactants used to prepare the polyester polyol.

As noted above, the polyester polyol is prepared with a polycarboxylic acid comprising a cyclic polycarboxylic acid. As used herein, a "polycarboxylic acid" refers to an organic compound with two or more carboxylic acid groups or an ester, such as the methyl ester or ethyl ester, or anhydride of the acid. As used herein, a "cyclic polycarboxylic acid" refers to a component comprising at least one closed ring structure, such as a carbocycle, with two or more carboxylic acid groups or the ester or anhydride of the acid. The cyclic polycarboxylic acid, typically a cyclic diacid, can include aromatic cyclic polycarboxylic acids, aliphatic cyclic polycarboxylic acids, and combinations thereof. Non-limiting examples of aromatic cyclic polycarboxylic acids, or the anhydride or ester thereof, include terephthalic acid, isophthalic acid, orthophthalic acid, phthalic anhydride, trimellitic acid, trimellitic anhydride, and combinations thereof. Non-limiting examples of aliphatic non-aromatic cyclic polycarboxylic acids, or the anhydride or ester thereof, include 1,4-cyclohexanedicarboxylic acid, 1,3-cyclohexanedicarboxylic acid, decahydronaphthalene dicarboxylic acid, 1,3-cyclopentanedicarboxylic acid, 1,1-cyclopropanedicarboxylic acid, hexahydrophthalic acid, hexahydrophthalic anhydride, and combinations thereof.

The polyester polyol described above can also be prepared with additional acid components including, but not limited to, linear and branched polycarboxylic acid components including the anhydrides or esters thereof. Non-limiting examples of such additional acid components, or the anhydride or ester thereof, include, but are not limited to, succinic acid, adipic acid, azelaic acid, sebacic acid, glutaric acid, and combinations thereof. When such additional acid components are used, the cyclic polycarboxylic acid comprises greater than 10 mole % such as at least 40 mole %, at least 50 mole %, at least 60 mole %, at least 70 mole %, at least 80 mole %, at least 90 mole %, at least 95 mole %, or at least 98 mole % of the total carboxylic acids used to prepare the polyester polyol including the anhydride and esters of such carboxylic acids. Alternatively, the cyclic polycarboxylic acid comprises 100 mole % of the total carboxylic acid components used to prepare the polyester polyol including the anhydride and esters of such carboxylic acid components.

The total amount of acid components used to prepare the polyester polyol can comprise at least 5 weight %, at least 10 weight %, at least 15 weight %, at least 20 weight %, at least 25 weight %, or at least 30 weight % of the total weight of the reactants used to prepare the polyester polyol. The total amount of acid components can comprise up to 70 weight %, up to 60 weight %, up to 50 weight %, or up to 45 weight % of the total weight of the reactants used to prepare the polyester polyol. The total amount of acid components can also comprise a range such as from 5 to 70 weight %, or from 20 to 60 weight %, or from 30 to 50 weight % of the total weight of the reactants used to prepare the polyester polyol.

The polyester polyol can also be prepared in the presence of catalysts. The catalyst may be any catalyst known in the art to be useful for the formation of polyesters. For example, non-limiting catalysts include triphenyl phosphite, butyl stannoic acid, and combinations thereof.

The mixture of reactants used to prepare the polyester polyol can be mixed together to form a molar ratio of hydroxyl group equivalents to carboxylic acid group equivalents of 1.2:1 or greater, 1.3:1 or greater, 1.4:1 or greater, 1.5:1 or greater, 1.8:1 or greater, 2.0:1 or greater, 2.5:1 or greater, or 3.0:1 or greater. The reactants described above can be mixed together to form a molar ratio of hydroxyl equivalents to carboxylic acid group equivalents of up to 3.5:1. The reactants described above can also be mixed together to form a molar ratio range of hydroxyl equivalents to carboxylic acid group equivalents such as from 1.2:1 to 3.5:1, or from 1.5:1 to 3.5:1 or from 1.8:1 to 3.0:1, or from 2.0:1 to 3.0:1.

The polyester polyol formed from the mixture of reactants can comprise a weight average molecular weight of less than 10,000 g/mol, less than 8,000 g/mol, less than 6,000 g/mol, or less than 5,000 g/mol. The weight average molecular weight is determined with gel permeation chromatography relative to linear polystyrene standards of 800 to 900,000 Da with tetrahydrofuran as the eluent at a flow rate of 1 ml min-1 using a Waters 2695 separation module with a Waters 410 differential refractometer (RI detector) and two PLgel Mixed-C (300×7.5 mm) columns for separation.

The polyester polyol can also have a hydroxyl value of greater than 200 mg KOH/g, greater than 250 mg KOH/g, greater than 300 mg KOH/g, or at least 325 mg KOH/g, or at least 350 mg KOH/g, or at least 375 mg KOH/g, or at least 400 mg KOH/g, or at least 425 mg KOH/g, or at least 450 mg KOH/g, or at least 475 mg KOH/g, or at least 500 mg KOH/g, or at least 525 mg KOH/g. Further, the polyester polyol can include a hydroxyl value of up to and including 550 mg KOH/g. The polyester polyol can also include a hydroxyl value range such as from 200 to 550 mg KOH/g, from 250 to 500 mg KOH/g, from 300 to 550 mg KOH/g, from 350 to 525 mg KOH/g, or from 400 to 525 mg KOH/g. The hydroxyl value is determined by esterification of the sample with excess acetic anhydride as previously described.

The polyester polyol and, optionally, any of the additional components that make up the coating composition described herein can be substantially free, essentially free, or completely free of polymerizable ethylenically unsaturated groups. The term "substantially free" as used in this context means the polyester polyol and, optionally, any of the additional components that make up the coating composition contain less than 1000 parts per million (ppm), "essentially free" means less than 100 ppm, and "completely free" means less than 20 parts per billion (ppb) of polymerizable ethylenically unsaturated groups based on the total weight of the polyester polyol and, optionally, any of the additional components that make up the coating composition described herein. As used herein, "ethylenically unsaturated" refers to a group having at least one carbon-carbon double bond. The term "polymerizable ethylenically unsaturated" refers to an ethylenically unsaturated group that participates in chemical reactions.

The polyester polyol can comprise at least 5 weight %, at least 10 weight %, at least 15 weight %, or at least 20 weight % of the coating composition, based on the total resin solids weight of the coating composition, which is the total solids of the fluoropolymer, polyester polyol, and optional additional film-forming resins and which does not include the crosslinker. The polyester polyol can comprise up to 99 weight %, up to 90 weight %, up to 80 weight %, up to 70 weight %, up to 60 weight %, up to 50 weight %, or up to 40 weight % of the coating composition, based on the total resin solids of the coating composition. The polyester polyol can also comprise a range such as from 5 to 99 weight %, from 10 to 60 weight %, or from 20 to 40 weight % of the coating composition, based on the total resin solids of the coating composition.

As indicated, the coating composition also comprises a crosslinker that is reactive with at least the functional groups of the fluoropolymer and the polyester polyol. As used herein, a "crosslinker" refers to a molecule comprising two or more functional groups that are reactive with other functional groups and which is capable of linking two or more monomers or polymer molecules through chemical bonds. It will be appreciated that the coatings of the present invention can cure through the reaction between the functional groups of the fluoropolymer and the polyester polyol, and the functional groups of the crosslinkers to form the resinous binder. "Curing" refers to bond formation resulting in the formation of a crosslinked coating. Curing may occur upon application of an external stimulus including, but not limited to, heat.

Non-limiting examples of crosslinkers include phenolic compounds, epoxy compounds, beta-hydroxy (alkyl) amide resins, alkylated carbamate resins, isocyanates, polyacids, anhydrides, organometallic acid-functional materials, polyamines, polyamides, aminoplasts, and mixtures thereof. As such, the crosslinkers can comprise, but are not limited to, compounds comprising isocyanate groups including blocked isocyanate groups, epoxide groups, acids groups, anhydride groups, amino groups such as primary and secondary amino groups, amide groups, aminoplast based compounds, and combinations thereof.

Non-limiting examples of isocyanates include multifunctional isocyanates (polyisocyanates) such as linear, branched, and/or cyclic polyisocyanates. The polyisocyanates can also be selected to only include certain types of polyisocyanates such as only linear and branched non-cyclic polyisocyanates for example. Examples of multifunctional polyisocyanates include aliphatic diisocyanates such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. Pat. No. 8,389,113 at column 4, lines 10-40, which is incorporated by reference herein. The polyisocyanates can also be selected from polyisocyanates that do not include (i.e., are free of) isocyanurate trimers, allophanates, or uretdiones. Suitable polyisocyanates are well known in the art and widely available commercially. Examples of commercially available isocyanates include DESMODUR® N 3300A, DESMODUR® Z 4470BA, DESMODUR® N 3900, and DESMODUR® N 3400, which are commercially available from Bayer Corporation.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Non-limiting examples of commercially available aminoplasts that can be used include CYMEL® 303, CYMEL® 322, CYMEL® 327, CYMEL® 380, and CYMEL® 1130 (available from Cytec Industries and/or Allnex).

Further, the crosslinker can also be added to the coating composition such that an equivalent ratio of the reactive functional groups on the crosslinker to reactive functional groups on the fluoropolymer and the polyester polyol is from 0.75:1 to 1.5:1, from 0.90:1 to 1.4:1, or from 1.05:1 to 1.25:1. For example, the crosslinker can comprise isocyanate groups and the fluoropolymer and the polyester polyol can comprise hydroxyl groups such that a ratio of total isocyanate equivalents to total hydroxyl equivalents is from 0.75:1 to 1.5:1, from 0.90:1 to 1.4:1, or from 1.05:1 to 1.25:1.

The coating composition can also include particles to further adjust the properties of coatings formed from the compositions of the present invention. For example, particles can be added to: lower gloss; improve abrasion, rub, and/or scratch resistance; control viscosity; and/or enhance soft touch properties such as the film hardness, coefficient of friction, and surface roughness. The particles can be inorganic and/or organic particles. Non-limiting examples of suitable particles include metal hydroxides, metal oxides, silicas, pyrogenic silica, wax-treated silica, micronized wax, polyether condensate, polyamide microbeads, polyurethane microbeads, silicone microbeads, and combinations thereof. Non-limiting examples of micronized waxes include polytetrafluoroethylene wax, polytetrafluoroethylene-modified polyethylene wax, polytetrafluoroethylene-modified polypropylene wax, carnauba wax, silicone wax, polyethylene wax, polypropylene wax, paraffinic wax, and combinations thereof.

The particles added to the coating compositions can have an average particle size of at least 0.5 micron, at least 1 micron, or at least 1.5 microns. The particles can have an average particle size of up to 30 microns, up to 25 microns, or up to 20 microns. The particles can also have an average particle size range such as from 0.5 micron to 30 microns, 0.5 micron to 20 microns, or from 1 micron to 20 microns. As used herein, "average particle size" refers to the mean (average) particle size of the total amount of particles in a sample as determined by laser diffraction analysis. The average particle size can be determined by a Malvern Mastersizer 2000 particle size analyzer following the instructions described in the Mastersizer 2000 manual. It was found that particles of certain sizes, such as those described above, provide good soft touch properties to coatings prepared from the compositions of the present invention. As used herein, "soft touch coatings" refer to coatings that can impart a range of soft touch or feel, for example, a velvety touch or feel, a silky touch or feel, or a rubbery touch or feel, to a substrate.

When used with the coating compositions of the present invention, the particles can be added such that a weight ratio of the particles to the total amount of the fluoropolymer, the polyester polyol, and crosslinker (i.e., the binder of the coating composition) is at least 0.05:1, at least 0.10:1, or at least 0.12:1. The particles can be added such that a weight ratio of the particles to the total amount of the fluoropolymer, polyester polyol, and crosslinker (collectively, the binder), referred to as particles to binder ratio, is at most 0.25:1, at most 0.20:1, or at most 0.15:1. The particles can also be added such that a weight ratio range of the particles to the total amount of the fluoropolymer, polyester polyol, and crosslinker is from 0.05:1 to 0.25:1, from 0.05:1 to 0.20:1, or from 0.10:1 to 0.20:1.

In addition, the particles can comprise at least 0.5 weight %, at least 1 weight %, or at least 5 weight % of the coating composition, based on the total solid weight of the coating composition. The particles can comprise up to 25 weight %, up to 20 weight %, or up to 15 weight % of the coating composition, based on the total solid weight of the coating composition. The particles can also comprise a range such as from 0.5 to 25 weight %, from 1 to 20 weight %, or from 5 to 15 weight % of the coating composition, based on the total solid weight of the coating composition.

The coating compositions can further include a silicone component. As used herein, a "silicone component" refers to a component such as a polymer in which at least a portion of its chemical structure comprises alternate silicon and oxygen atoms. The silicone component can comprise at least one, at least two, or at least three reactive functional groups that are reactive with at least the crosslinker. The reactive functional groups can include, but are not limited to, a hydroxyl group, thiol group, (meth)acrylate group, carboxylic acid group, amine group, epoxide group, carbamate group, amide group, urea group, isocyanate group (including blocked isocyanate group), and combinations thereof. The reactive functional groups can be bonded directly to a silicon atom.

The silicone component can include polymers with side chains comprising alternating silicon and oxygen atoms and which may include any of the reactive functional groups previously described. For example, the silicone component can comprise a silicone-modified polymer including, but not limited to, (meth)acrylate polymers, polyether polymers, polyamide polymers, polyamine polymers, and combinations thereof, and which include side chains that extend out from the backbone or main chain of such polymers and comprise alternate silicon and oxygen atoms. The reactive functional groups can be bonded directly to a silicon atom. A non-limiting example of such a silicone component is a hydroxyl-functional silicone-modified polyacrylate such as BYK®-SILCLEAN 3700 available from Byk Additives & Instruments.

Other non-limiting examples of suitable silicone components include polyalkylsiloxanes and which may include any of the reactive functional pendant and/or terminal groups previously described. For instance, the silicone components can include, but are not limited to, polymethylsiloxanes, polydimethylsiloxanes, and combinations thereof and which may include any of the reactive functional pendant and/or terminal groups.

The silicone component can comprise at least 0.05 weight %, at least 0.1 weight %, at least 0.2 weight %, or at least 1 weight % of the coating composition, based on the total solid weight of the coating composition, i.e. all solid components used. The silicone component can comprise up to 10 weight %, up to 8 weight %, or up to 5 weight % of the coating composition, based on the total solid weight of the coating composition. The silicone component can also comprise a range such as from 0.05 to 10 weight % or from 0.2 to 5 weight % of the coating composition, based on the total solid weight of the coating composition.

The coating compositions of the present invention can also include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, organic solvents, organic cosolvents, reactive diluents, catalysts, reaction inhibitors, and other customary auxiliaries.

Non-limiting examples of suitable organic solvents include polar organic solvents e.g. protic organic solvents such as glycols, glycol ether alcohols, alcohols; and ketones, glycol diethers, esters, and diesters.

The coatings formed from the coating compositions of the present invention can be applied to a wide range of substrates known in the coatings industry. For example, the coatings of the present invention can be applied to automotive substrates including automotive interior substrates such as dashboards, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, wood, veneer, wood composite, particle board, medium density fiberboard, cement, stone, glass, paper, cardboard, textiles, leather, both synthetic and natural, and the like.

The coatings of the present invention are particularly useful when applied to automotive interiors and consumer electronic products. For example, the coatings of the present invention can be applied to substrates found on laptops, tablets, cellular phones, other handheld electronic devices, and the like. As such, the present invention further includes an electronic device or electronic component having a surface at least partially coated with the coating compositions described herein. As used herein, "electronic device" and like terms refers to any kind of device capable of processing data which is transmitted or received to or from any external entity. An "electronic component" refers to a component associated with or part of an electronic device.

The coatings formed from the coating compositions of the present invention can be applied by any means standard in the art, such as electrocoating, spraying, electrostatic spraying, dipping, rolling, brushing, and the like. The coatings of the present invention can be applied to a dry film thickness of 10 µm to 100 µm, 12 µm to 70 µm, or 15 µm to 45 µm.

The coating compositions of the present invention may also be used alone or in combination with primers and/or basecoats. A "primer coating composition" refers to a coating composition from which an undercoating may be deposited onto a substrate in order to prepare the surface for application of a protective or decorative coating system. A basecoat refers to a coating composition from which a coating is deposited onto a primer and/or directly onto a substrate optionally including components (such as pigments) that impact the color and/or provide other visual impact and which may be overcoated with a protective and decorative coating system.

As indicated above, the coating compositions can be applied to a substrate and cured to form coatings that have good stain resistance. For example, coatings formed from the coating compositions described herein have been found to exhibit a Delta E (DE or ΔE) of less than 20, less than 15, less than 12, less than 10, less than 8, less than 6, less than 4, less than 2, or less than 1 for mustard and lipstick stains after at least 168 hours of exposure. In addition, coatings formed from the coating compositions described herein have also been found to exhibit a Delta E (DE or ΔE) of less than 3, less than 2, or less than 1 for sun screen, hand lotion, coffee, ketchup, stamp ink, cola, and sebum stains after at least 168 hours of exposure. The Delta E (DE or ΔE) values were determined by a GretagMacBeth Color-Eye® 2145 Spectrophotometer with a cool white fluorescent light source. The DE value is based on the CIE94 color system using L*a*b* coordinates, and, as used herein, refers to the difference between the color of unstained and stained coating samples. The DE value is measured using the following method: (1) apply a coating to a substrate using a coating composition described herein; (2) measure the color of the unstained coated substrate; (3) apply a substance such as those described above to induce staining on the coating; (4) after a certain period of time, such as 168 hours of exposure, gently wipe the staining substance off of the coated sample with isopropanol or a soap solution; and (5) calculate the DE value from the color change between the unstained coating and the stained coating. The lower the DE value exhibited by the coating, the greater the stain resistance provided by the coating. The described method is also referred to as the "staining test method."

In addition to good stain resistance, the coating compositions can be applied to a substrate and cured to form coatings that have a soft, smooth touch or feel. For example, coatings formed from the coating compositions described herein have been found to exhibit: a Fischer microhardness of less than 180 N/mm$^2$, or less than 160 N/mm$^2$, or less than 140 N/mm$^2$, as measured by a Fischerscope HM2000 stylus microhardness instrument following the instruction described in the Fischerscope HM2000 Manual ("Fischer microhardness test"); a coefficient of friction ranging from 0.01 to 0.50, or from 0.05 to 0.4, or from 0.1 to 0.3, as measured by a Dynisco Polymer Test—1055 coefficient of friction tester utilizing a felt contact according to ASTM Method D1894-14; and/or a surface roughness of 1 micro-inch to 60 micro-inches, or 5 micro-inch to 60 micro-inches, or from 8 micro-inches to 40 micro-inches, or from 10 micro-inches to 30 micro-inches, or from 10 micro-inches to 25 micro-inches, as measured by a Taylor Hobson Precision Surtronic Duo profilometer following the instruction described in the Taylor Hobson Precision Surtronic Duo Manual ("surface roughness test"). As used herein, "Fischer microhardness" refers to the hardness of a material to deformation, "coefficient of friction" refers to the ratio of the force that maintains contact between an object and a surface and the frictional force that resists the motion of the object, and "surface roughness" refers to the texture of a surface such as the texture of a surface of a coating that is quantified by the vertical deviations of the surface from its ideal form.

Thus, the coating compositions described herein can be applied to a substrate to form coatings that have a soft touch, good stain resistance, and other properties desired in a coating.

The following examples are presented to demonstrate the general principles of the invention. The invention should not be considered as limited to the specific examples presented. All parts and percentages in the examples are by weight unless otherwise indicated.

EXAMPLE 1

Polyester Polyol Preparation

Various polyester polyols were prepared from the components listed in Table 1.

TABLE 1

| | Polyester Polyol Sample (grams) | | | | | | | | | | |
|---|---|---|---|---|---|---|---|---|---|---|---|
| Component | 1 | 2$^a$ | 3$^a$ | 4$^a$ | 5 | 6 | 7 | 8 | 9 | 10 | 11 |
| 1,6 Hexanediol | | 15 | | 15.6 | 14.5 | 15.2 | 16.7 | 15.7 | | | |
| HPHP glycol | 22.7 | | 23.3 | | | | | | | 22.7 | 22.8 |
| Neopentyl glycol | | | | | | | | | 19.2 | | |
| 2-Methyl-1,3-propanediol | 11.5 | 11.8 | 11.8 | 11.8 | 11.0 | 11.6 | 12.7 | 14.4 | 12.4 | 11.5 | 11.6 |
| Trimethylol propane | 33.3 | 36.8 | 34.2 | 38.3 | 35.5 | 28.8 | 22.1 | 18.4 | 23.1 | 27.4 | 22.7 |

TABLE 1-continued

| | Polyester Polyol Sample (grams) | | | | | | | | | | |
|---|---|---|---|---|---|---|---|---|---|---|---|
| Component | 1 | 2 [a] | 3 [a] | 4 [a] | 5 | 6 | 7 | 8 | 9 | 10 | 11 |
| 1,4 Cyclohexane-dicarboxylic acid | 32.5 | | | | 39 | 44.4 | 48.6 | 51.5 | 45.4 | 38.4 | |
| Adipic acid | | 36.9 | 30.8 | | | | | | | | |
| Succinic acid | | | | 34.2 | | | | | | | |
| Isophthalic acid | | | | | | | | | | | 32.1 |

[a] Comparative polyester sample

Ten (10) different polyester polyol samples were prepared by independently mixing their respective components listed in Table 1 in a suitable reaction vessel. The contents of the vessel was heated to 140° C. and a nitrogen cap was switched to a nitrogen sparge. Heating was continued to 180° C. at which time water began to evolve from the reaction. The temperature of the reaction mixture was raised to 215° C. in stages and held for a period of time. The contents of the reactor were cooled to less than 80° C. and poured out. Various properties of each polyester polyol sample are shown in Table 2.

TABLE 2

| Polyester Polyol Sample No. | Hydroxyl value (mgKOH/g) [1] | Weight Average Molecular Weight (Mw) [2] | Number Average Molecular Weight (Mn) [2] |
|---|---|---|---|
| 1 | 512 | 858 | 506 |
| 2 [a] | 511 | 1268 | 862 |
| 3 [a] | 490 | 1156 | 838 |
| 4 [a] | 490 | 1189 | 803 |
| 5 | 501 | 1051 | 765 |
| 6 | 402 | 1260 | 625 |
| 7 | 310 | 1760 | 794 |
| 8 | 251 | 2423 | 983 |
| 9 | 400 | 1337 | 884 |
| 10 | 400 | 1184 | 612 |
| 11 | 491 | 865 | 510 |

[1] Determined by esterification of the sample with excess acetic anhydride as previously described.
[2] Determined by gel permeation chromatography relative to linear polystyrene standards of 800 to 900,000 Da with tetrahydrofuran as the eluent at a flow rate of 1 ml min−1 using a Waters 2695 separation module with a Waters 410 differential refractometer (RI detector) and two PLgel Mixed-C (300 × 7.5 mm) columns for separation.

EXAMPLES 2-5

Resin Hydroxyl Value Evaluation

Four (4) coating compositions were prepared from the components listed in Table 3.

TABLE 3

| Component | Example 2 (grams) | Example 3 (grams) | Example 4 (grams) | Example 5 (grams) |
|---|---|---|---|---|
| Methyl n-amyl ketone | 15 | 15 | 15 | 15 |
| Xylene | 10 | 10 | 10 | 10 |
| Acetone | 10 | 10 | 10 | 10 |
| Polyester sample 5 | 16.5 | | | |
| Polyester sample 6 | | 16.5 | | |
| Polyester sample 7 | | | 16.5 | |
| Polyester sample 8 | | | | 16.5 |
| Fluoropolymer resin [3] | 27.5 | 27.5 | 27.5 | 27.5 |
| DISPERBYK®-2163 [4] | 1 | 1 | 1 | 1 |
| BYK®-322 [5] | 0.2 | 0.2 | 0.2 | 0.2 |
| SYLOID® CP4-8991 [6] | 6.8 | 6.2 | 5.7 | 5.31 |
| 10% dibutyltin dilaurate in n-butyl acetate | 1 | 1 | 1 | 1 |
| BYK®-SILCLEAN 3700 [7] | 1.5 | 1.5 | 1.5 | 1.5 |
| DESMODUR® N 3300 [8] | 33.78 | 28.14 | 22.58 | 18.76 |

[3] A fluoro-ethylene alkyl-vinyl ether copolymer having hydroxyl functionality.
[4] Wetting and dispersing additive, commercially available from BYK Additives & Instruments.
[5] Silicone-containing surface additive, commercially available from BYK Additives & Instruments.
[6] Silica matting agent, commercially available from GRACE.
[7] Solution of an OH-functional silicone modified polyacrylate, commercially available from BYK Additives & Instruments.
[8] Aliphatic polyisocyanate resin based on hexamethylene diisocyanate (HDI), commercially available from Bayer MaterialScience.

Each of the coating compositions listed in Table 3 were prepared by mixing methyl n-amyl ketone, xylene, acetone, polyester polyol resin, fluoropolymer resin, DISPERBYK®-2163, and BYK®-322 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SILCLEAN 3700, and Desmodur® N 3300 were added to the solution. After 2-5 minutes of mixing, the coating solution was thinned with a 40:60 blend of methyl amyl ketone (MAK):acetone resulting in a viscosity of 10-12 seconds when measured by a #2 Iwata cup. Various properties of the coating compositions are listed in Table 4.

TABLE 4

| Properties | Example 2 | Example 3 | Example 4 | Example 5 |
|---|---|---|---|---|
| % Solids | 35 | 35 | 35 | 35 |
| NCO:OH Eq. Ratio | 1.1:1 | 1.1:1 | 1.1:1 | 1.1:1 |
| Particle to Binder Ratio | 0.1:1 | 0.1:1 | 0.1:1 | 0.1:1 |

The coating compositions of Examples 2-5 were sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured for 8 hours at 80° C. The coatings had a dry film thickness of 25-35 microns.

Each of the coatings formed from the compositions of Examples 2-5 were evaluated for stain resistance. The following procedure was used to evaluate stain resistance: (1) standard spectrophotometer color reading for each clean coated panel was measured using a GretagMacBeth Color-Eye® 2145 Spectrophotometer with a cool white fluorescent light source at a 10° viewing angle and using the CIE 94 color space; (2) staining substances were applied in a circular motion to separate quadrants of the coated panels until an area of 4-5 cm² or a circle with a diameter of 2.4 cm is fully covered; (3) half of the panels were exposed to atmospheric conditions for 24 hours and the other half was exposed for 168 hours; and (4) the DE value was calculated from the color change between the unstained coating and the stained coating after cleaning each panel with a dry paper towel followed by a gentle wipe with isopropanol. The results of the staining test are shown in Table 5.

TABLE 5

| Property Test | Example 2 | Example 3 | Example 4 | Example 5 |
|---|---|---|---|---|
| 60° Gloss [9] | 5 | 5.3 | 6 | 5 |
| DE after 24 hours of exposure to mustard [10] | 0.35 | 3.69 | 5.48 | 12.3 |
| DE after 168 hours of exposure to mustard [10] | 7.68 | 12.56 | 17.02 | 38.36 |
| DE after 24 hours of exposure to sunscreen [11] | 0.26 | 0.2 | 0.19 | 0.75 |
| DE after 168 hours of exposure to sunscreen [11] | 0.1 | 0.3 | 0.73 | 1.06 |
| DE after 24 hours of exposure to lipstick [12] | 0.57 | 0.94 | 1.73 | 5.7 |
| DE after 168 hours of exposure to lipstick [12] | 0.39 | 1.5 | 2.85 | 6.63 |
| DE after 24 hours of exposure to blue ink [13] | 0.34 | 0.76 | 1.18 | 3.7 |
| DE after 168 hours of exposure to blue ink [13] | 1.53 | 6.58 | 9.2 | 19.8 |

[9] Determined with a Micro-Tri-Gloss instrument available from BYK Additives & Instruments.
[10] FRENCH'S ® Classic Yellow Mustard, commercially available from The French's Food Company LLC.
[11] Banana Boat ® Sport Performance SPF 30 sunscreen, commercially available from Banana Boat ®.
[12] Maybelline Red Revolution (630) lipstick, commercially available from L'Oréal.
[13] Carter's Stamp Pad Blue Ink, commercially available from Carter's Ink Company.

As shown in Table 5, the coatings formed from the compositions of Examples 2-5 all exhibited a 60° gloss of 5 to 6. Further, Example 2 exhibited the best stain resistant followed by Examples, 3, 4, and 5, respectively. The coating of Example 5 exhibited lower stain resistance with higher DE values than the coatings of Examples 2-4. Referring to Tables 1-3, Example 5 was prepared with a polyester polyol having a hydroxyl value of 251 mg KOH/g, while Examples 2, 3, and 4 were prepared with polyester polyols having a hydroxyl value of 501 mg KOH/g, 402 mg KOH/g, and 310 mg KOH/g, respectively.

EXAMPLES 6-9

Polyester Polyol Compositional Evaluation

Four (4) coating compositions were first prepared from the components listed in Table 6.

TABLE 6

| Component | Comparative Example 6 (grams) | Comparative Example 7 (grams) | Comparative Example 8 (grams) | Example 9 (grams) |
|---|---|---|---|---|
| DOWANOL ™ PM Acetate [14] | 5 | 5 | 5 | 5 |
| Methyl isobutyl ketone | 10 | 10 | 10 | 10 |
| Methyl n-amyl ketone | 10 | 10 | 10 | 10 |
| Xylene | 10 | 10 | 10 | 10 |
| Polyester Sample 2 [a] | 13.2 | | | |
| Polyester Sample 3 [a] | | 13.2 | | |
| Polyester Sample 4 [a] | | | 13.2 | |
| Polyester Sample 5 | | | | 13.2 |
| Fluoropolymer Resin [3] | 33 | 33 | 33 | 33 |
| DISPERBYK ®-2163 [4] | 1 | 1 | 1 | 1 |
| BYK ®-322 [5] | 0.2 | 0.2 | 0.2 | 0.2 |
| SYLOID ® CP4-8991 [6] | 5.5 | 5.5 | 5.5 | 5.5 |
| 10% dibutyltin dilaurate in n-butyl acetate | 1 | 1 | 1 | 1 |
| BYK ®-SILCLEAN 3700 [7] | 0.7 | 0.7 | 0.7 | 0.7 |
| DESMODUR ® N 3300 [8] | 44.84 | 44.84 | 44.84 | 44.84 |

[14] Glycol ether solvent, commercially available from The Dow Chemical Company.

The coating compositions of Examples listed in Table 6 were prepared by mixing DOWANOL™ PM Acetate, methyl isobutyl ketone, methyl n-amyl ketone, xylene, polyester polyol resin, fluoropolymer resin, DISPERBYK®-2163, and BYK®-322 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SIL-CLEAN 3700, and Desmodur® N 3300 were added to the solution. After 2-5 minutes, the coating solution was thinned with a 40:60 blend of MAK:acetone resulting in a viscosity of 10-12 seconds when measured by a #2 Iwata cup. Various properties of the coating compositions are listed in Table 7.

TABLE 7

| Properties | Comparative Example 6 | Comparative Example 7 | Comparative Example 8 | Example 9 |
|---|---|---|---|---|
| % Solids | 35 | 35 | 35 | 35 |
| NCO:OH Eq. Ratio | 1.05:1 | 1.05:1 | 1.05:1 | 1.05:1 |
| Particle to Binder Ratio | 0.09:1 | 0.09:1 | 0.09:1 | 0.09:1 |

The coating compositions of Examples 6-9 were sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured for 8 hours at 80° C. The coatings had a dry film thickness of 25-35 microns.

Each of the coatings formed from the compositions of Examples 6-9 were evaluated for stain resistance using the method described in Examples 2-5, except that half the panels were exposed to atmospheric conditions for 96 hours instead of 168 hours. The results of the staining test are shown in Table 8.

TABLE 8

| Property Test | Comparative Example 6 | Comparative Example 7 | Comparative Example 8 | Example 9 |
|---|---|---|---|---|
| 60° Gloss[9] | 5 | 6 | 7 | 8 |
| DE after 24 hours of exposure to mustard[10] | 17.2 | 12.84 | 27.43 | 1.4 |
| DE after 96 hours of exposure to mustard[10] | 45.7 | 13.5 | 31.16 | 6.2 |
| DE after 24 hours of exposure to sunscreen[11] | 0.3 | 0.31 | 0.47 | 0.21 |
| DE after 96 hours of exposure to sunscreen[11] | 0.67 | 0.71 | 1.05 | 0.45 |
| DE after 24 hours of exposure to lipstick[12] | 6.8 | 2.16 | 6.99 | 0.4 |
| DE after 96 hours of exposure to lipstick[12] | 12.73 | 3.27 | 8.6 | 1.14 |
| DE after 24 hours of exposure to Ketchup[15] | 0.34 | 0.24 | 0.44 | 0.18 |
| DE after 96 hours of exposure to Ketchup[15] | 1.3 | 0.38 | 1.5 | 0.35 |
| DE after 24 hours of exposure to Sebum[16] | 0.16 | 0.04 | 0.19 | 0.17 |
| DE after 96 hours of exposure to Sebum[16] | 0.27 | 0.13 | 0.28 | 0.13 |

[15]Heinz ® Tomato Ketchup, commercially available from H. J. Heinz Company.
[16]Synthetic Sebum, commercially available from Scientific Services S/D Inc.

As shown in Table 8, the coatings formed from the compositions of Examples 6-9 exhibited a 60° gloss of 5 to 8. Example 9, which comprised a polyester polyol prepared with an aliphatic cyclic polycarboxylic acid, exhibited better stain resistance than Comparative Examples 6, 7, and 8, which comprised a polyester polyol prepared with a linear polycarboxylic acid.

EXAMPLES 10-11

Polyester Polyol Compositional Evaluation

Two (2) coating compositions were prepared from the components listed in Table 9.

TABLE 9

| Component | Example 10 (grams) | Example 11 (grams) |
|---|---|---|
| Methyl n-amyl ketone | 15 | 15 |
| Xylene | 10 | 10 |
| Acetone | 15 | 15 |
| Polyester Sample 9 | 16.5 | |
| Polyester Sample 10 | | 16.5 |
| Fluoropolymer Resin[3] | 27.5 | 27.5 |
| DISPERBYK ®-2163[4] | 1 | 1 |
| BYK ®-322[5] | 0.2 | 0.2 |
| SYLOID ® CP4-8991[6] | 6.2 | 6.2 |
| 10% dibutyltin dilaurate in n-butyl acetate | 1 | 1 |
| BYK ®-SILCLEAN 3700[7] | 1.5 | 1.5 |
| DESMODUR ® N 3300[8] | 46.61 | 46.61 |

The coating compositions of Examples 10 and 11 listed in Table 9 were prepared by mixing methyl n-amyl ketone, xylene, acetone, polyester polyol resin, fluoropolymer resin, DISPERBYK®-2163, and BYK®-322 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SILCLEAN 3700, and Desmodur® N 3300 were added to the solution. After 2-5 minutes, the coating solution was thinned with a 40:60 blend of MAK:acetone resulting in a viscosity of 10-12 seconds when measured by a #2 Iwata cup. Various properties of the coating compositions are listed in Table 10.

TABLE 10

| Properties | Example 10 | Example 11 |
|---|---|---|
| % Solids | 35 | 35 |
| NCO:OH Eq. Ratio | 1.1:1 | 1.1:1 |
| Particle to Binder Ratio | 0.1:1 | 0.1:1 |

The coating compositions of Examples 10-11 were sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured for 8 hours at 80° C. The coatings had a dry film thickness of 25-35 microns.

Each of the coatings formed from the compositions of Examples 10-11 were evaluated for stain resistance using the method described in Examples 2-5, except that half the panels were exposed to atmospheric conditions for 72 hours instead of 24 hours. The results of the staining test are shown in Table 11.

TABLE 11

| Property Test | Example 10 | Example 11 |
|---|---|---|
| 60° Gloss[9] | 7 | 8 |
| DE after 72 hours of exposure to mustard[10] | 9.8 | 2.26 |
| DE after 168 hours of exposure to mustard[10] | 21.8 | 5.29 |
| DE after 72 hours of exposure to sunscreen[11] | 0.29 | 0.37 |
| DE after 168 hours of exposure to sunscreen[11] | 1.05 | 0.48 |
| DE after 72 hours of exposure to lipstick[12] | 3.21 | 0.27 |
| DE after 168 hours of exposure to lipstick[12] | 4.61 | 3.38 |
| DE after 72 hours of exposure to Ketchup[15] | 0.25 | 0.25 |
| DE after 168 hours of exposure to Ketchup[15] | 1.34 | 0.38 |

As shown in Table 11, the coatings formed from the compositions of Examples 10-11 exhibited a 60° gloss of 7 to 8. Further, Example 11, which comprised a polyester polyol prepared with an ester diol, exhibited better stain resistance than Example 10, which comprised a polyester polyol prepared with a non-ester diol.

EXAMPLES 12-13

Polyester Polyol Compositional Evaluation

Two (2) coating compositions were prepared from the components listed in Table 12.

TABLE 12

| Component | Example 12 (grams) | Example 13 (grams) |
|---|---|---|
| Methyl n-amyl ketone | 5 | 5 |
| Xylene | 10 | 10 |
| Acetone | 10 | 10 |
| Polyester Sample 1 | 10.9 | |
| Polyester Sample 11 | | 10.9 |
| Fluoropolymer Resin[3] | 22.1 | 22.1 |
| DISPERBYK ®-2163[4] | 1 | 1 |
| BYK ®-322[5] | 0.2 | 0.2 |
| SYLOID ® CP4-8991[6] | 7 | 7 |

TABLE 12-continued

| Component | Example 12 (grams) | Example 13 (grams) |
|---|---|---|
| 10% dibutyltin dilaurate in n-butyl acetate | 1 | 1 |
| BYK®-SILCLEAN 3700[7] | 2.2 | 2.2 |
| DESMODUR® N 3300[8] | 25.03 | 25.23 |

The coating compositions of Examples 12 and 13 were prepared by mixing methyl n-amyl ketone, xylene, acetone, polyester polyol resin, fluoropolymer resin, DISPERBYK®-2163, and BYK®-322 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SILCLEAN 3700, and Desmodur® N 3300 were added to the solution. After 2-5 minutes, the coating solution was thinned with a 40:60 blend of MAK:acetone resulting in a viscosity of 10-12 seconds when measured by a #2 Iwata cup. Various properties of the coating compositions are listed in Table 13.

TABLE 13

| Properties | Example 12 | Example 13 |
|---|---|---|
| % Solids | 35 | 35 |
| NCO:OH Eq. Ratio | 1.1:1 | 1.1:1 |
| Particle to Binder Ratio | 0.1:1 | 0.1:1 |

The coating compositions of Examples 12 and 13 were sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured for 8 hours at 80° C. The coatings had a dry film thickness of 25-35 microns.

Each of the coatings formed from the compositions of Examples 12 and 13 were evaluated for stain resistance using the method described in Examples 2-5, except that half the panels were exposed to atmospheric conditions for 72 hours instead of 24 hours. The results of the staining test are shown in Table 14.

TABLE 14

| Property Test | Example 12 | Example 13 |
|---|---|---|
| 60° Gloss[9] | 5 | 5 |
| DE after 72 hours of exposure to mustard[10] | 1.62 | 0.78 |
| DE after 168 hours of exposure to mustard[10] | 5.1 | 1.25 |
| DE after 72 hours of exposure to sunscreen[11] | 0.22 | 0.16 |
| DE after 168 hours of exposure to sunscreen[11] | 0.28 | 0.26 |
| DE after 72 hours of exposure to lipstick[12] | 0.65 | 0.37 |
| DE after 168 hours of exposure to lipstick[12] | 0.92 | 0.25 |
| DE after 72 hours of exposure to Ketchup[15] | 0.25 | 0.15 |
| DE after 168 hours of exposure to Ketchup[15] | 0.22 | 0.16 |

As shown in Table 14, the coatings formed from the compositions of Examples 12 and 13 exhibited a 60° gloss of 5. Further, Example 13, which comprised a polyester polyol prepared with an aromatic polycarboxylic acid, exhibited improved stain resistance as compared to Example 12, which comprised a polyester polyol prepared with an aliphatic cyclic polycarboxylic acid. It is noted that the polyester polyols in Examples 12 and 13 had similar hydroxyl values of around 500 mg KOH/g.

EXAMPLE 14

Soft Touch Evaluation

The coating formed from the coating composition of Example 9 as previously described was evaluated for various soft touch properties, the results of which are shown in Table 15.

TABLE 15

| Test | Result |
|---|---|
| Fischer Micro-hardness (N/mm$^2$)[17] | 130 |
| Surface Roughness (Micro-inches)[18] | 20 |
| Coefficient of Friction[19] | 0.15 |

[17]Measured by a Fischerscope HM2000 stylus microhardness instrument following the instruction described in the Fischerscope HM2000 Manual.
[18]Measured by a Taylor Hobson Precision Surtronic Duo profilometer following the instruction described in the Taylor Hobson Precision Surtronic Duo Manual.
[19]Measured by a Dynisco Polymer Test - 1055 coefficient of friction tester utilizing a felt contact according to ASTM Method D1894-14.

As shown in Table 15, the coating formed from the composition of Example 9 exhibited good soft touch properties, i.e. a soft, smooth surface with low friction.

EXAMPLE 15

Polyester Polyol Preparation

Two (2) polyester polyols were prepared from the components listed in Table 16.

TABLE 16

| | Polyester Polyol Sample (grams) | |
|---|---|---|
| Component | Sample 12 | Sample 13 |
| HPHP glycol | 23.84 | 18.14 |
| 2-Methyl-1,3-propanediol | 10.53 | 8.56 |
| Trimethylol propane | 20.88 | 27.44 |
| Isophthalic acid | 44.75 | 46.42 |

Two (2) different polyester polyol samples were prepared by independently mixing their respective components listed in Table 16 in a suitable reaction vessel. The contents of the vessel was heated to 140° C. and a nitrogen cap was switched to a nitrogen sparge. Heating was continued to 180° C. at which time water began to evolve from the reaction. The temperature of the reaction mixture was raised to 215° C. in stages and held for a period of time. The contents of the reactor were cooled to less than 80° C. and poured out. Various properties of each polyester polyol sample are shown in Table 17.

TABLE 17

| Polyester Polyol Sample No. | Hydroxyl value (mg KOH/g)[1] | Weight Average Molecular Weight (Mw)[2] | Number Average Molecular Weight (Mn)[2] |
|---|---|---|---|
| 12 | 238 | 1146 | 2728 |
| 13 | 246.19 | 1309 | 3744 |

EXAMPLES 16-18

Polyester Polyol Compositional Evaluation

Three (3) coating compositions were prepared from the components listed in Table 18.

TABLE 18

| Component | Example 16 (grams) | Example 17 (grams) | Example 18 (grams) |
|---|---|---|---|
| Methyl n-amyl ketone | 15 | 15 | 15 |
| n-butyl acetate | 10 | 10 | 10 |
| Acetone | 5 | 5 | 5 |
| Polyester sample 12 | 22.1 | | |
| Polyester sample 13 | | 22.1 | |
| Polyester sample 1 | | | 22.1 |
| Zeffle ® S-7530[20] | 16.77 | 16.77 | 16.77 |
| DISPERBYK ®-2163[4] | 1 | 1 | 1 |
| BYK ®-322[5] | 0.2 | 0.2 | 0.2 |
| SYLOID ® CP4-8991[6] | 6.62 | 6.62 | 9.09 |
| 10% dibutyltin dilaurate in n-butyl acetate | 1 | 1 | 1 |
| BYK ®-SILCLEAN 3700[7] | 1.5 | 1.5 | 1.5 |
| DESMODUR ® N 3300[8] | 22.39 | 23.04 | 45.12 |

[20]Tetrafluoroethylene based fluoropolymer, commercially available from Daikin Industries, Inc.

The coating compositions of Examples 16-18 were prepared by mixing methyl n-amyl ketone, n-butyl acetate, acetone, polyester polyol resin, Zeffle® S-7530, DISPERBYK®-2163, and BYK®-322 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SILCLEAN 3700, and Desmodur® N 3300 were added to the solution. After 2-5 minutes of mixing, the coating solution was thinned with a 40:60 blend of methyl amyl ketone (MAK):acetone resulting in a viscosity of 10-12 seconds when measured by a #2 Iwata cup.

The coating compositions of Examples 16-18 were sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured at 80° C. for 8 hours. The coatings had a dry film thickness of 25-35 microns.

Each of the coatings formed from the compositions of Examples 16-18 were evaluated for stain resistance using the method described in Examples 2-5, except that half the panels were exposed to atmospheric conditions for 72 hours instead of 24 hours. The results of the staining test are shown in Table 19.

TABLE 19

| Property Test | Example 16 | Example 17 | Example 18 |
|---|---|---|---|
| 60° Gloss[9] | 3.2 | 3.1 | 7 |
| DE after 72 hours of exposure to mustard[10] | 4.99 | 2.56 | 0.84 |
| DE after 168 hours of exposure to mustard[10] | 9.2 | 3.55 | 3.03 |
| DE after 72 hours of exposure to sunscreen[11] | 0.26 | 0.04 | 0.14 |
| DE after 168 hours of exposure to sunscreen[11] | 0.43 | 0.21 | 0.29 |
| DE after 72 hours of exposure to lipstick[12] | 5.16 | 1.36 | 0.51 |
| DE after 168 hours of exposure to lipstick[12] | 5.57 | 1.74 | 0.32 |
| DE after 72 hours of exposure to blue ink[13] | 3.58 | 0.92 | 0.19 |
| DE after 168 hours of exposure to blue ink[13] | 5.65 | 2.73 | 1.2 |

As shown in Table 19, the coatings formed from the compositions of Examples 16 and 17 exhibited a 60° gloss of about 3 while the coating formed from the composition of Example 18 exhibited a 60° gloss of 7. Further, Example 17 exhibited better stain resistance than Example 16, which comprised a polyester polyol prepared with a lower amount of trimethylol propane than the polyester polyol used in Example 17. In addition, Example 17, which was prepared with an aromatic cyclic polycarboxylic acid and which had a hydroxyl value of 246.19 mg KOH/g, exhibited good stain resistance when compared to the good stain resistance coating formed from the composition of Example 18, which was prepared with an aliphatic cyclic polycarboxylic acid and which had a hydroxyl value of 512 mg KOH/g.

COMPARATIVE EXAMPLE 19

Comparative Performance without Fluoropolymer Resin

One (1) coating composition was prepared from the components listed in Table 20.

TABLE 20

| Component | Comparative Example 19 (grams) |
|---|---|
| DOWANOL ™ PM Acetate[14] | 15 |
| Methyl isobutyl ketone | 10 |
| n-butyl acetate | 15 |
| Polyester Sample 1 | 33 |
| DISPERBYK ®-2163[4] | 1 |
| BYK ®-370[21] | 0.6 |
| SYLOID ® CP4-8991[6] | 11.23 |
| 10% dibutyltin dilaurate in n-butyl acetate | 1.3 |
| BYK ®-SILCLEAN 3700[7] | 0.7 |
| DESMODUR ® N 3300[8] | 63.11 |

[21]Silicone-containing surface additive, polyester-modified, with hydroxyl functionality, commercially available from The Dow Chemical Company.

The coating composition of Example 19 was prepared by mixing DOWANOL™ PM Acetate, methyl isobutyl ketone, n-butyl acetate, polyester polyol resin, DISPERBYK®-2163, and BYK®-370 in an un-lined paint can at ambient temperature using an appropriately sized Cowles blade. Once the components formed a homogenous solution, SYLOID® CP4-8991 was slowly added to the solution. The speed of the Cowles blade was then increased and the mixture was allowed to grind for 30 minutes. After grinding, 10% dibutyltin dilaurate in n-butyl acetate, BYK®-SILCLEAN 3700, and DESMODUR® N 3300 were added to the solution. After 2-5 minutes of mixing, the coating solution was thinned with a 40:60 blend of MAK:acetone resulting in a viscosity of 9-12 seconds when measured by a #2 Iwata cup. Various properties of the coating compositions are listed in Table 21.

TABLE 21

| Properties | Comparative Example 19 |
|---|---|
| % Solids | 40 |
| NCO/OH Eq. Ratio | 1.1 |
| Particle to Binder Ratio | 0.12 |

The coating composition of Comparative Example 19 was sprayed onto a white colored polycarbonate/acrylonitrile butadiene styrene (PC/ABS) substrate. The coated panels were allowed to flash off excess solvent for 5 minutes at ambient temperature before being placed in a heated oven at 60° C. for 30 minutes. After the initial 30 minutes, the panels were post cured for 8 hours in 80° C. The coatings had a dry film thickness of 25-35 microns. The panels were then tested for stain resistance and the results are shown in Table 22. In addition, Table 22 also includes the stain resistant results of Example 12 for comparative purposes.

TABLE 22

| Property Test | Comparative Example 19 | Example 12 |
|---|---|---|
| 60° Gloss[9] | 7 | 5 |
| DE after 72 hours of exposure to mustard[10] | 20.2 | 1.62 |
| DE after 168 hours of exposure to mustard[10] | 24.3 | 5.1 |
| DE after 72 hours of exposure to sunscreen[11] | 0.33 | 0.22 |
| DE after 168 hours of exposure to sunscreen[11] | 0.17 | 0.28 |
| DE after 72 hours of exposure to lipstick[12] | 1.86 | 0.65 |
| DE after 168 hours of exposure to lipstick[12] | 1.83 | 0.92 |
| DE after 72 hours of exposure to Ketchup[15] | 0.64 | 0.25 |
| DE after 168 hours of exposure to Ketchup[15] | 0.46 | 0.22 |

As shown in Table 22, the coating formed from the composition of Comparative Example 19 exhibited a 60° gloss of 7 while the coating formed from the composition of Example 12 exhibited a 60° gloss of 5. Further, Example 12, which comprised the polyester polyol of sample 1 and a fluoropolymer, exhibited better stain resistance than Comparative Example 19, which comprised the polyester polyol of sample 1 and which did not include a fluoropolymer. Example 12 particularly exhibited a significantly better stain resistance to mustard. It is appreciated that Comparative Example 19 and Example 12 were both prepared with the same polyester polyol of sample 1, which had a high hydroxyl value of 512 mg KOH/g.

The present invention is also directed to the following clauses.

Clause 1: A coating composition comprising: (a) a fluoropolymer comprising at least one reactive functional group; (b) a polyester polyol comprising a reaction product prepared from a mixture of reactants comprising an aliphatic diol, a polyol comprising 3 or more hydroxyl groups, and a cyclic polycarboxylic acid, or an anhydride or ester thereof; and (c) a crosslinker reactive with (a) and (b).

Clause 2: The coating composition of clause 1, wherein the cyclic polycarboxylic acid (iii) comprises at least 40 mole %, at least 50 mole %, at least 60 mole %, at least 70 mole %, at least 80 mole %, at least 90 mole %, at least 95 mole %, or at least 98 mole % of the total carboxylic acids used to prepare the polyester polyol (b).

Clause 3: The coating composition of clauses 1 or 2, wherein the fluoropolymer (a) comprises a fluoroethylene/alkyl vinyl ether copolymer that comprises at least one reactive functional group.

Clause 4: The coating composition of any of clauses 1 to 3, wherein the at least one reactive functional group of the fluoropolymer (a) comprises a hydroxyl group.

Clause 5: The coating composition of any of clauses 1 to 4 comprising the fluoropolymer (a) in an amount of from 40 to 90 weight % such as from 60 to 80 weight % of the total amount of (a) and (b).

Clause 6: The coating composition of any of clauses 1 to 5, further comprising particles having an average particle size of up to 30 microns.

Clause 7: The coating composition of clause 6, wherein the particles have an average particle size of 0.5 micron to 30 microns.

Clause 8: The coating composition of any of clauses 6 or 7, wherein the particles are inorganic particles such as silicas, metal hydroxides, and metal oxides.

Clause 9: The coating composition of any of clauses 6 to 8, wherein the coating composition comprises a weight ratio of the particles to the total of (a), (b), and (c) of 0.05:1 to 0.25:1.

Clause 10: The coating composition of any of clauses claims 1 to 9, wherein the polyester polyol (b) comprises a hydroxyl value of greater than 300 mg KOH/g.

Clause 11: The coating composition of any of clause 10, wherein the polyester polyol (b) has a hydroxyl value of at least 400 mg KOH/g.

Clause 12: The coating composition of any of clauses 1 to 11, wherein the polyester polyol (b) is completely free of polymerizable ethylenically unsaturated groups.

Clause 13: The coating composition of any of clauses 1 to 12, wherein the polyol (ii) comprising 3 or more hydroxyl groups comprises at least 20 weight % of the mixture of reactants used to prepare the polyester polyol (b) based on the total weight of the reactants.

Clause 14: The coating composition of any of clauses 1 to 13, wherein the cyclic polycarboxylic acid (iii) comprises an aliphatic cyclic polycarboxylic acid.

Clause 15: The coating composition of any of clauses 1 to 13, wherein the cyclic polycarboxylic acid (iii) comprises an aromatic cyclic polycarboxylic acid.

Clause 16: The coating composition of any of clauses 1 to 15, wherein the molar ratio of hydroxyl group equivalents to carboxylic acid group equivalents of the reactants forming the polyester polyol (b) is from 1.2:1 to 3.5:1 such as from 1.8:1 to 3.0:1.

Clause 17: The coating composition of any of clauses 1 to 16, wherein the polyester polyol (b) is prepared with at least two different aliphatic diols (i).

Clause 18: The coating composition of any of clauses 1 to 17, wherein the aliphatic diol (i) comprises a branched aliphatic diol.

Clause 19 The coating composition of any of clauses 1 to 18, wherein the branched aliphatic diol (i) comprises 50 to 100 mol % such as 60 to 90 mol % of the total amount of diols to prepare the polyester poyol (b).

Clause 20: The coating composition of any of clauses 1 to 19, wherein the diol (i) comprises 3-hydroxy-2,2-dimethylpropyl 3-hydroxy-2,2-dimethylpropanoate.

Clause 21: The coating composition of any of clauses 1 to 20, wherein the polyester polyol (b) has a weight average molecular weight of less than 10,000 g/mol as determined by gel permeation chromatography versus a polystyrene standard relative to linear polystyrene standards of 800 to 900,000 Da with tetrahydrofuran as the eluent at a flow rate of 1 ml min-1 using a Waters 2695 separation module with a Waters 410 differential refractometer (RI detector) and two PLgel Mixed-C (300×7.5 mm) columns for separation.

Clause 22: The coating composition of clause 21, wherein the polyester polyol (b) has a weight average molecular weight of less than 8,000 g/mol, less than 6,000 g/mol, or less than 5,000 g/mol, as determined by gel permeation chromatography versus a polystyrene standard relative to linear polystyrene standards of 800 to 900,000 Da with tetrahydrofuran as the eluent at a flow rate of 1 ml min-1 using a Waters 2695 separation module with a Waters 410 differential refractometer (RI detector) and two PLgel Mixed-C (300×7.5 mm) columns for separation.

Clause 23: The coating composition of any of clauses 1 to 22, wherein the crosslinker (c) comprises a polyisocyanate.

Clause 24: The coating composition of any of clauses 1 to 23, wherein the molar ratio of reactive functional groups on the crosslinker (c) to reactive functional groups on components (a) and (b) is from 0.90:1 to 1.4:1 such as from 1.05:1 to 1.25:1.

Clause 25: The coating composition of any of clauses 1 to 24, further comprising a silicone component having at least one functional group that is reactive with the crosslinker.

Clause 26: The coating composition of clause 25, wherein the at least one reactive functional group of the silicone component is a hydroxyl group.

Clause 27: The coating composition of any of clause 25 or 26, wherein the silicone component comprises two or more reactive functional groups.

Clause 28: A substrate at least partially coated with a coating formed from the coating composition of any of clauses 1 to 27.

Clause 29: An electronic device or electronic component comprising a surface at least partially coated with a coating formed from the coating composition of any of clauses 1 to 27.

Clause 30: A method for coating a substrate such as an electronic device or electronic component, comprising applying the coating composition of any of clauses 1 to 27 and curing the coating composition.

Clause 31: Use of the coating composition of any of clauses 1 to 27 to coat an electronic device or electronic component.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   (a) a fluoropolymer comprising at least one reactive functional group;
   (b) a polyester polyol comprising a reaction product prepared from a mixture of reactants comprising:
      (i) an aliphatic diol;
      (ii) a polyol comprising 3 or more hydroxyl groups; and
      (iii) a cyclic polycarboxylic acid, or an anhydride or ester thereof; and
   (c) a crosslinker reactive with (a) and (b),
   wherein the polyol comprising 3 or more hydroxyl groups comprises at least 20 weight % of the mixture of reactants used to prepare the polyester polyol based on the total weight of the reactants.

2. The coating composition of claim 1, wherein the cyclic polycarboxylic acid, or the anhydride or ester thereof, comprises at least 40 mole % of the total carboxylic acids, or anhydrides or esters thereof, used to prepare the polyester polyol.

3. The coating composition of claim 1, wherein the fluoropolymer comprises a fluoroethylene/alkyl vinyl ether copolymer that comprises at least one reactive functional group.

4. The coating composition of claim 1, wherein the at least one reactive functional group of the fluoropolymer comprises a hydroxyl group.

5. The coating composition of claim 1, further comprising particles having an average particle size of up to 30 microns.

6. The coating composition of claim 4, wherein the particles have an average particle size of 0.5 micron to 30 microns.

7. The coating composition of claim 1, wherein the polyester polyol (b) comprises a hydroxyl value of greater than 200 mg KOH/g.

8. The coating composition of claim 1, wherein the polyester polyol (b) comprises a hydroxyl value of at least 300 mg KOH/g.

9. The coating composition of claim 1, wherein the polyester polyol (b) is completely free of polymerizable ethylenically unsaturated groups.

10. The coating composition of claim 1, wherein the cyclic polycarboxylic acid, or the anhydride or ester thereof, comprises an aromatic cyclic polycarboxylic acid, or the anhydride or ester thereof.

11. The coating composition of claim 1, wherein the molar ratio of hydroxyl group equivalents to carboxylic acid group equivalents of the reactants forming the polyester polyol is from 1.2:1 to 3.5:1.

12. The coating composition of claim 1, wherein the polyester polyol is prepared with at least two different aliphatic diols.

13. The coating composition of claim 1, wherein the aliphatic diol comprises a branched aliphatic diol.

14. The coating composition of claim 1, wherein the polyester polyol has a weight average molecular weight of less than 10,000 g/mol as determined by gel permeation chromatography versus a polystyrene standard with tetrahydrofuran as an eluent.

15. The coating composition of claim 1, wherein the crosslinker comprises a polyisocyanate.

16. The coating composition of claim 5, wherein the coating composition comprises a weight ratio of the particles to the total of (a), (b), and (c) of 0.05:1 to 0.25:1.

17. The coating composition of claim 1, further comprising a silicone component comprising at least one reactive functional group that is reactive with the crosslinker.

18. The coating composition of claim 17, wherein the at least one reactive functional group of the silicone component comprises a hydroxyl group.

19. A substrate at least partially coated with a coating formed from the composition of claim 1.

20. An electronic device or electronic component comprising a surface at least partially coated with a coating formed from the composition of claim 1.

* * * * *